（12） United States Patent
Tooman

(10) Patent No.: US 7,018,199 B2
(45) Date of Patent: Mar. 28, 2006

(54) MACHINED MANIFOLD HAVING INTEGRAL PADS

(75) Inventor: Patrick A. Tooman, Clarkston, MI (US)

(73) Assignee: Plastic Engineering & Technical Services, Inc., Auburn Hills, MI (US)

( * ) Notice: Subject to any disclaimer, the term of this patent is extended or adjusted under 35 U.S.C. 154(b) by 0 days.

(21) Appl. No.: 10/883,931

(22) Filed: Jul. 2, 2004

(65) Prior Publication Data
US 2005/0208175 A1    Sep. 22, 2005

Related U.S. Application Data

(60) Provisional application No. 60/527,489, filed on Dec. 5, 2003.

(51) Int. Cl.
*B29C 45/22* (2006.01)
(52) U.S. Cl. ........................ 425/572; 425/588
(58) Field of Classification Search ............... 425/572, 425/588
See application file for complete search history.

(56) References Cited
U.S. PATENT DOCUMENTS

| 4,173,448 | A | 11/1979 | Rees et al. |
| 4,964,795 | A | 10/1990 | Tooman |
| 5,378,138 | A | 1/1995 | Onuma et al. |
| 5,470,219 | A | 11/1995 | Yokoyama et al. |
| 5,783,234 | A | 7/1998 | Teng |
| 5,820,803 | A | 10/1998 | Hashimoto |
| 5,834,041 | A | 11/1998 | Sekine et al. |
| 5,919,492 | A | 7/1999 | Tarr et al. |
| 6,086,357 | A | 7/2000 | Steil et al. |
| 6,099,767 | A | 8/2000 | Tarr et al. |
| 6,129,541 | A | 10/2000 | Takeda |
| 6,294,122 | B1 | 9/2001 | Moss et al. |
| 6,343,925 | B1 | 2/2002 | Jenko |
| 6,436,320 | B1 * | 8/2002 | Kazmer et al. ............. 425/572 |
| 6,514,440 | B1 | 2/2003 | Kazmer et al. |
| 2003/0155672 | A1 | 8/2003 | Kazmer et al. |

* cited by examiner

*Primary Examiner*—Tim Heitbrink
(74) *Attorney, Agent, or Firm*—Bliss McGlynn, P.C.

(57) ABSTRACT

A manifold for conveying injection molding material into a mold from a molding material supply and method for making same includes a main flow member having a central flow passage extending through the main flow member along a longitudinal axis of the main flow member. The main flow member also includes a plurality of branching passages each transverse to and in fluid communication with the central flow passage. The main flow member has an outer surface that is generally round in cross sectional shape. The outer surface is machined so as to be generally round in cross sectional shape.

9 Claims, 7 Drawing Sheets

MACHINED MANIFOLD HAVING INTEGRAL PADS

CROSS REFERENCE TO RELATED APPLICATION(S)

This application claims the benefit of copending U.S. Provisional Patent Application Ser. No. 60/527,489, filed Dec. 5, 2003.

BACKGROUND OF THE INVENTION

1. Field of the Invention

The present invention relates generally to manifolds for injection molding and, more particularly, to a machined manifold and method of making same for injection molding.

2. Description of the Related Art

Injection molding is a widely known manufacturing process used to produce a variety of parts. Injection molding involves introducing a molten material, for example a molten plastic or resin, into a cavity within a mold until the cavity is filled. The molten material hardens in the mold in the shape of inner surfaces of the cavity. After the molten material hardens or cures, the hardened or cured material is removed from the cavity.

For injection molding, a manifold assembly is typically used for conveying molten material from a central injection portion or sprue to a number of cavities or to multiple points within one large cavity of the mold. An example of such a manifold assembly is disclosed in U.S. Pat. No. 4,964,795 to Tooman. In that patent, a manifold assembly has an integral or one piece, cast, cylindrical manifold with a passageway and at least one nozzle extending radially outwardly from the manifold and having a passageway through which a molten material may pass. The terminal end of the passageway of the nozzle, called a gate, is in fluid communication with the cavity of the mold.

However, it is desirable to provide a manifold assembly that is not cast. It is also desirable to provide a manifold assembly that can be machined from a block or bar. It is further desirable to provide a machined manifold assembly that is generally round or has a generally round or circular cross-sectional shape. Therefore, there is a need in the art to provide a manifold assembly that meets these desires.

SUMMARY OF THE INVENTION

Accordingly, the present invention is a manifold adapted for conveying injection molding material into a mold from a molding material supply. The manifold includes a main flow member that defines a central flow passage extending through the main flow member along a longitudinal axis of the main flow member. The main flow member also defines a plurality of branching passages each transverse to and in fluid communication with the central flow passage. Furthermore, the main flow member defines an outer surface that is generally round in cross section. The outer surface is machined so as to be generally round in cross section.

In addition, the present invention is a method of making a machined manifold for conveying injection molding material into a mold from a molding material supply. The method includes the steps of providing a bar having a longitudinal axis. The method also includes the step of machining the bar to form a central flow passage along the longitudinal axis of the bar, a plurality of branching passages each transverse to and in fluid communication with the central flow passage, and an outer surface of the manifold that is generally round in cross sectional shape.

One advantage of the present invention is that a machined manifold assembly is provided, thereby eliminating a casting process. Another advantage of the present invention is that the machined manifold assembly is machined from a block or bar. Yet another advantage of the present invention is that the machined manifold assembly is machined with a round or circular cross-sectional shape. Still another advantage of the present invention is that a method of making a machined manifold is provided. A further advantage of the present invention is that the method allows a manifold to be machined, saving cost and time in comparison with casting operations in some situations. A further advantage of the present invention is that the method, during the injection molding process, allows heat to be more evenly distributed through the manifold due to the rounded outer surface, thereby improving the quality of the molded parts.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
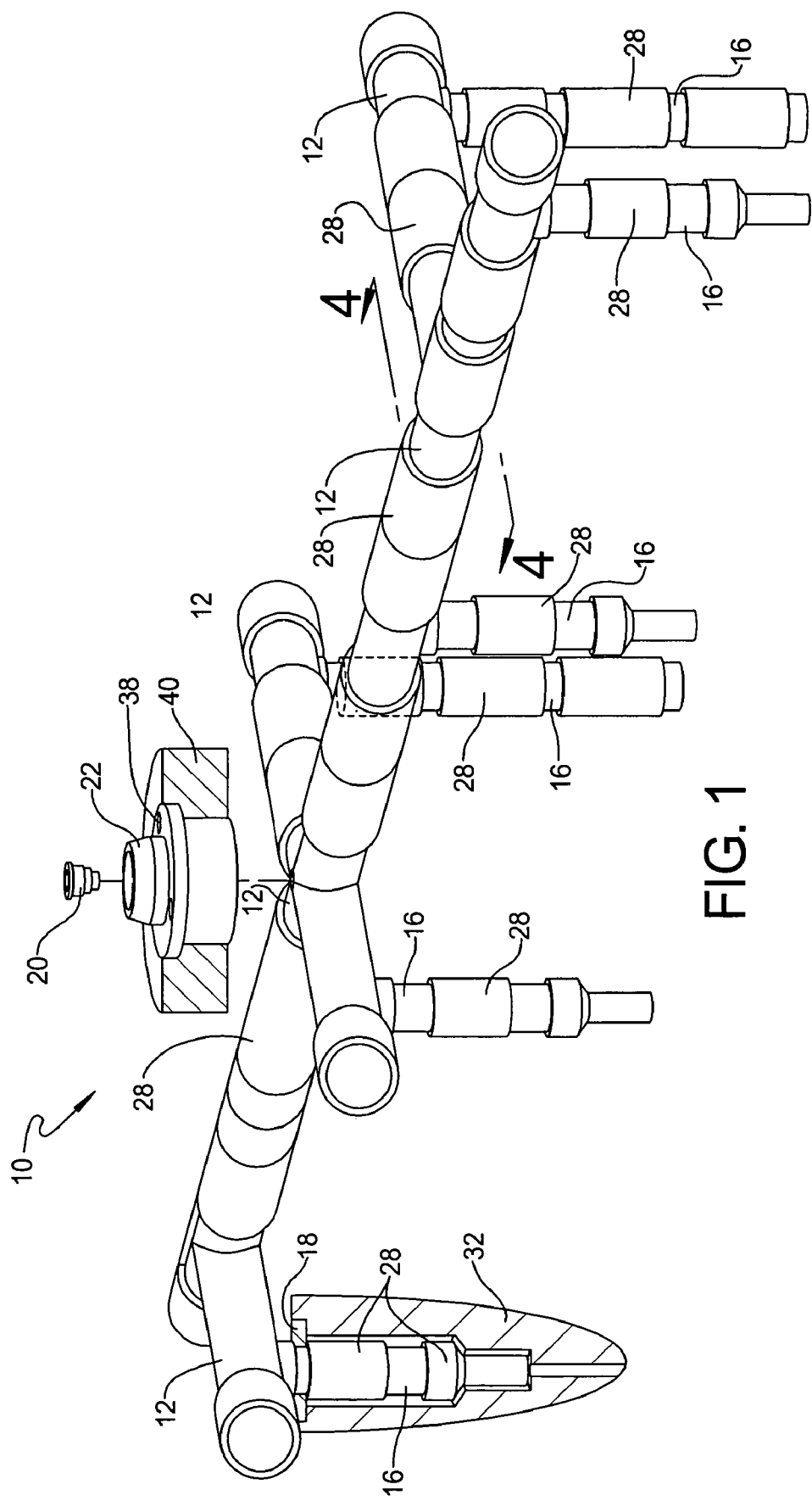
FIG. 1 is a perspective view of a machined manifold assembly, according to the present invention.

Referring to the drawings, and in particular to FIG. 1, one embodiment of a machined manifold assembly 10, according to the present invention, is shown. The machined manifold assembly 10 includes an integral or one piece, machined, cylindrical manifold 12 including a central flow passage 14 extending along the manifold 12 including each branch of the manifold 12 and at least one nozzle 16 extending downwardly from the manifold 12. Each nozzle 16 includes a central nozzle passage 17 extending from the manifold flow passage 14. Each nozzle 16 may be of varying length in order to conform to the various mold cavity dimensions, which may be required for a particular mold.

The manifold 12 and at least one nozzle 16 are made of a metal material. The manifold 12 and at least one nozzle 16 are machined from either a square block or round bar. The manifold 12 and at least one nozzle 16 are formed as a monolithic structure being integral, unitary, and one-piece.

The machined manifold assembly 10 includes a first insulator 18 in the form of a titanium insulating ring disposed about each of the nozzles 16 for inhibiting the heat transfer between each nozzle 16 and the core or cavity 32. The manifold 12 is further insulated from the core or cavity 32 by support blocks 34. The manifold 12 is removably secured to the support blocks 34 and the core 32 by a dowel pin 36, which extends through the support blocks 34 and into locational engagement with both the manifold 12 and the core 32. The machined manifold assembly 10 also includes a P-20 sprue bushing 20 extending radially outward from the manifold 12 for facilitating the introduction of injection molding material into the manifold 12. The sprue 20 is insulated from a support member or clamp plate 40 by a second insulator 22 in the form of a stainless steel locating ring disposed between the junction of the sprue 20 and the support member or clamp plate 40. The second insulator 22 is a stainless steel locating ring which is removably secured to the clamp plate 40 by fasteners 38 such as a bolt, or the like, and which inhibits the heat transfer from the sprue 20 to the clamp plate 40. It should be appreciated that the molten material may be of a plastic, metal, wood fibers, steel, etc. and is injected into the sprue 20 of the machined manifold assembly 10 from a molding machine (not shown).

The machined manifold assembly 10 includes a third insulator 24 disposed at the radiused terminal ends 13 of each branch of the manifold 12 to facilitate relatively low heat transfer from the ends of the manifold 12 to the surrounding material. The third insulator 24 is in the form of a 400 Stainless steel plug defining the radiused terminal ends 13 of the central flow passage 14 of the manifold 12. The third insulator 24 has a curved end 42 which form the radiused ends 13 within the central flow passage 14. The curved end 42 reduces the amount of flow shear within the molten material, which may occur at these corners as the flow moves through a right angle turn from the manifold passage 14 to the adjacent nozzle passage 17. The machined manifold assembly 10 includes a threaded double nut 44 disposed at the ends of the manifold passages 14 to cap the passages 14 and facilitate the removal of the third insulators 24 if this is required.

The machined manifold assembly 10 includes titanium reaction members 26 removably secured radially opposite the radially extending nozzles 16 by fasteners such as a screw 54, or the like, and insulate the manifold 12 from a clamp plate 40. In addition, the reaction members 26 are preload pads that react between the clamp plate 40 and the manifold 12, supporting the manifold 12 when it is under resulting pressures produced in the manifold 12 during the injection molding process.

The machined manifold assembly 10 also includes at least one, preferably a plurality of electrical heaters 28 in the form of heater bands removably disposed about the circumference of the manifold 12 as well as the nozzles 16 to supply heat to maintain the plastic at a specified or predetermined temperature. The heaters 28 are formed as two half cylinders on the manifold 12 and electrically wired in parallel to an electrical source such as a junction box. The half cylinders of the heaters 28 are removably clamped about the circumference of the manifold 12 and nozzles 16 using conventional clamping fasteners or the like. It should be appreciated that the half cylinders of the heaters 28 are circumferentially discontinuous to form a gap therebetween as is known in the art.

Figure 4:
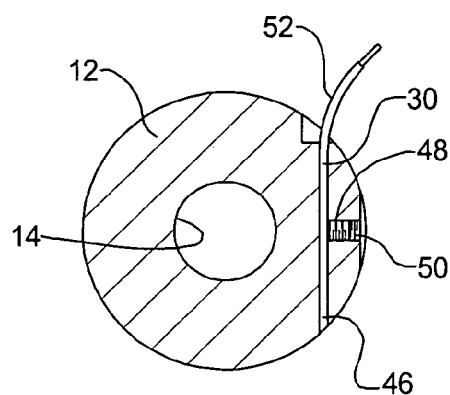
FIG. 4 is a fragmentary view of either the manifold or the nozzle showing thermocouple placement.

The machined manifold assembly 10 includes at least one, preferably a plurality of temperature-measuring sensors 30 for monitoring the temperature of the molten material. The sensors 30 are secured within the manifold 12 and nozzles 16 in sensor apertures or holes 46 bored through the manifold 12 and the nozzle 16 at points equidistant from the outer diameter of the flow passages 14, 17 and the outer diameter of the manifold 12 and nozzle 16, as illustrated in FIG. 4. The temperature-measuring sensors 30 may be of a thermocouple type secured in the sensor apertures 46 by set screws positioned in threaded apertures 50 which are bored perpendicular to the longitudinal axis of the sensor apertures 46. The sensors 30 are electrically wired to a power source such as an electrical junction box and include a stainless braided wire shield 52 which protect against radio frequency noise interference from the heaters electrical current wires (not shown) and thus insure accurate temperature readings.

The heaters 28 and sensors 30 are arranged and monitored in finite zones about the injection system. This multizonal control facilitates more accurate monitoring and control of the temperature of the molten material throughout the injection process resulting in less heat loss and better molds.

In operation, molten material is injected at high temperatures and pressures into the manifold 12 through the sprue bushing 20. The molten material then flows along the central flow passage 14 of the manifold 12 to the nozzles 16. The molten material then flows through the nozzle passages 17 of each nozzle 16 to the mold (not shown). The terminal ends 13 of the manifold 12, equipped with the third insulators 24 with curved ends 42, reduce shear flow in the molten material at the terminal ends 13 of the manifold 12 as the flow moves through a ninety degree (90°) bend.

Throughout the injection process, the heaters 28 maintain the molten material at a specified temperature, which is monitored by the sensors 30. The multizonal designs of the heaters and sensors 28 and 30, respectively, allows the operator to monitor the temperature of the molten material at any point or zone throughout the system thereby exerting increased control over the injection process which results in a better product.

Figure 5:
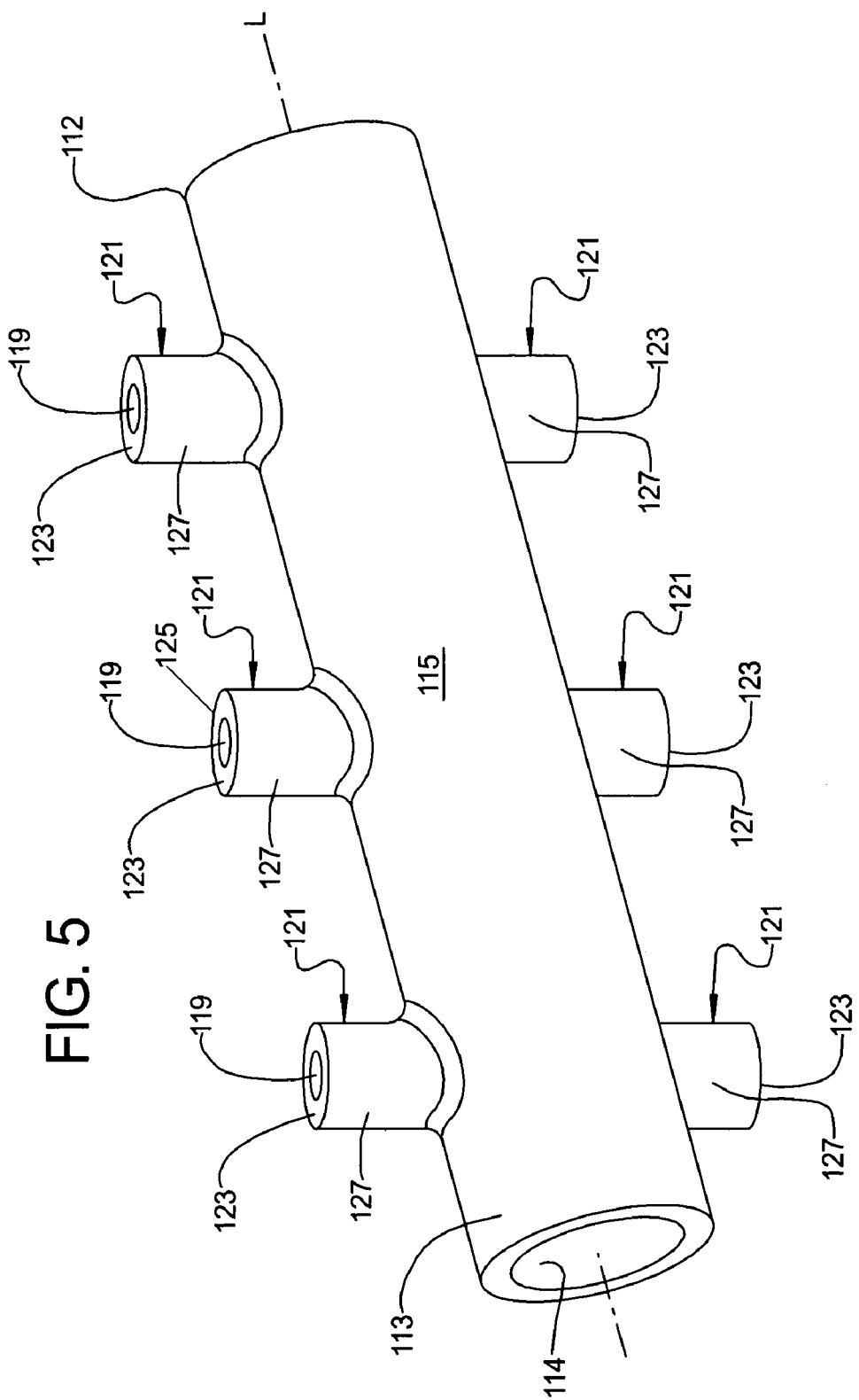
FIG. 5 is a perspective view of another embodiment, according to the present invention, of a manifold for the machined manifold assembly of FIG. 1.
Figure 6:
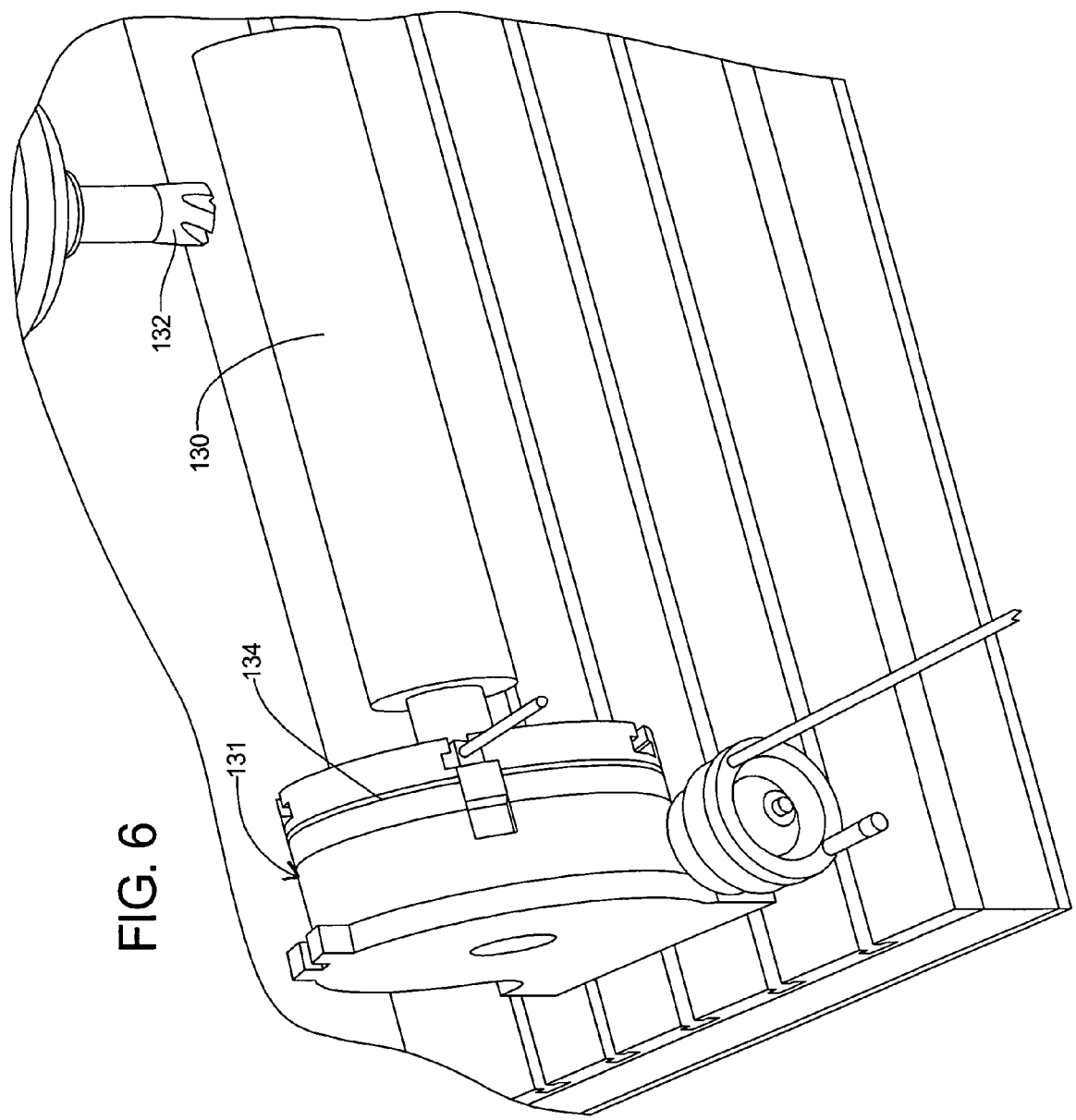
FIG. 6 is a perspective view of a method of making a machined manifold assembly, according to the present invention, illustrating a first step.

Referring to FIG. 5, another embodiment, according to the present invention, of the machined manifold 12 is shown. Like parts of the manifold 12 have like reference numerals increased by one hundred (100). In this embodiment, the machined manifold 112 includes a main flow member 113 that is cylindrical in shape so as to define an outer surface 115 that is generally round or circular in cross sectional shape. The main flow member 113 is made out of a metal material. The main flow member 113 defines a central flow passage 114 extending through the main flow member 113 along a longitudinal axis, L, of the main flow member 113. Preferably, the central flow passage 114 is generally round in cross section and is centered within the main flow member 113. The main flow member 113 also defines a plurality of branching passages 119 each transverse to and in fluid communication with the central flow passage 114. As will be described in greater detail below, the manifold 112 conveys injection molding material into a mold (not shown) from a molding material supply (not shown) via the central flow passage 114 and the branching passages 119. It should be appreciated that the manifold 112 is machined so as to be generally round in cross section and that this shape allows heat to be distributed more evenly through the manifold 112.

The manifold 112 also includes a plurality of pads, generally indicated at 121. The pads 121 are each generally cylindrical in shape and extend outwardly from the outer surface 115 of the main flow member 113. Each pad 121 defines a flat, round terminal end 123. The pads 121 are integral to the main flow member 113 and are machined in a manner to be discussed subsequently in greater detail. As illustrated in FIG. 5, the branching passages 119 extend through corresponding ones of the pads 121 and are centered on the terminal end 123 of the respective pad 121.

Figure 2:
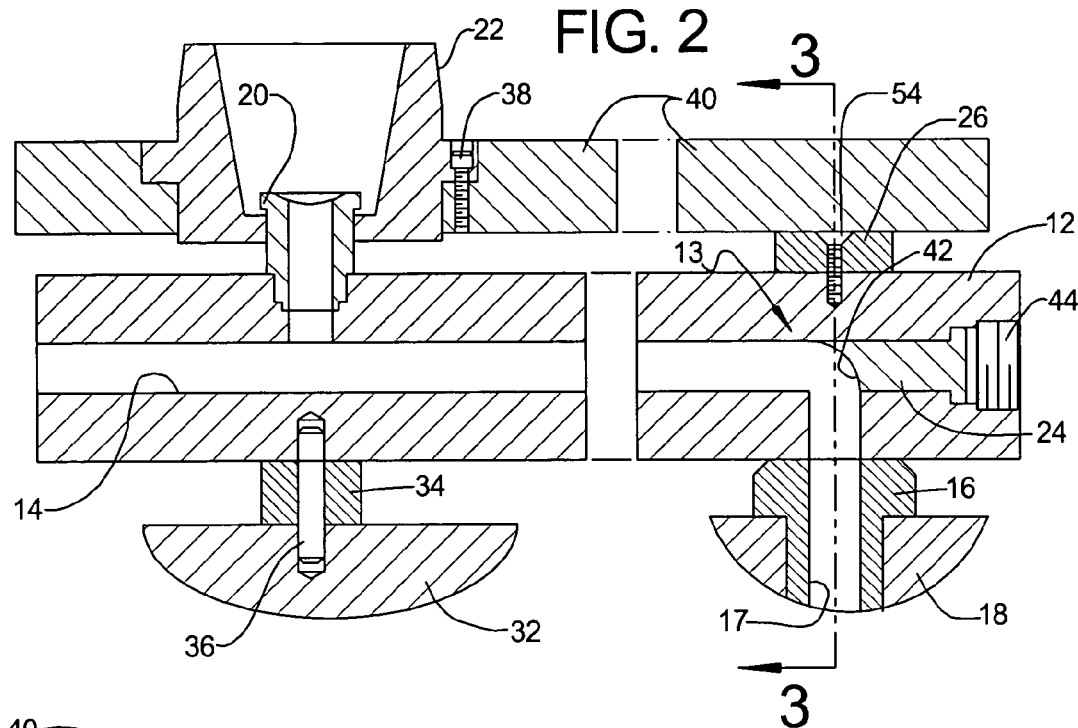
FIG. 2 is a fragmentary view of a portion of the machined manifold assembly of FIG. 1.
Figure 3:
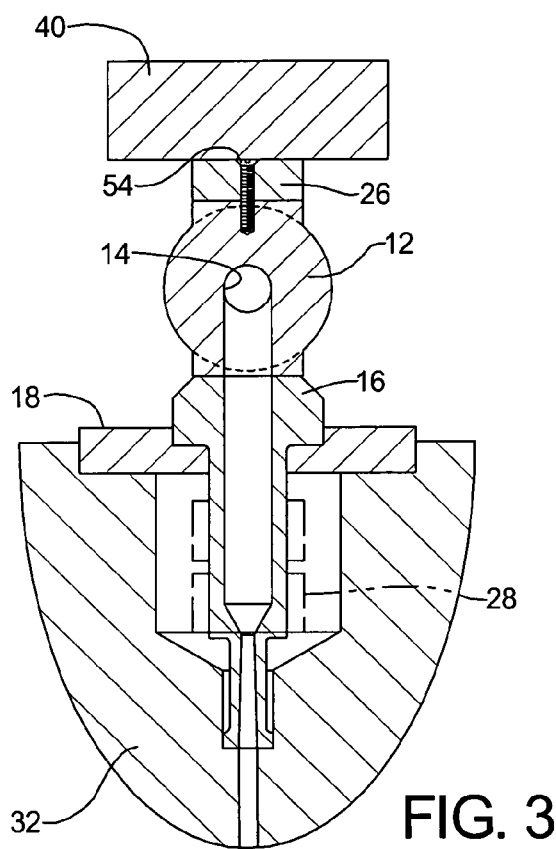
FIG. 3 is a sectional view taken along line 3—3 of FIG. 2.

In the embodiment illustrated, the manifold 112 includes six pads 121. Three of the pads 121 are aligned longitudinally on one side of the manifold 112 while the other three pads 121 are aligned longitudinally on the other side of the manifold 112. The pads 121 include one sprue pad 125 and a plurality of nozzle pads 127. The sprue pad 125 and nozzle pads 127 are identical except that the sprue pad 125 extends outward from the outer surface 115 of the main flow member 113 further than the nozzle pads 127. The sprue pad 125 is positioned on the manifold 112 and dimensioned such that the branching passage 119 extending through the sprue pad 125 can fluidly communicate with a sprue (not shown), such as the sprue 20 illustrated in FIGS. 1 and 2. The nozzle pads 127 are positioned on the manifold 112 and dimensioned such that the branching passages 119 extending through the nozzle pads 127 can fluidly communicate with a nozzle (not shown), such as the nozzles 16 illustrated in FIGS. 1 through 3. It should be appreciated, however, that the positioning and dimensions of the pads 121 can vary according to the sprue and/or nozzles employed.

The manifold 112 of FIG. 5 can be used in an injection molding process. The manifold 112 is assembled with other parts of the machined manifold assembly 10 and disposed in an injection molding machine (not shown) such that a sprue (not shown) fluidly communicates with the branching passage 119 of the sprue pad 125, and nozzles 16 fluidly communicate with corresponding branching passages 119 of the nozzle pads 127. In one embodiment, the terminal ends 123 of the pads 121 act as pressure plates such that the sprue (not shown) and nozzles 16 can be pressed against the pads 121 to thereby prevent leakage of molten injection molding material.

Furthermore, the ends of the main flow member 113 are plugged to seal the ends of the central flow passage 114. The main flow member 113 can be plugged in any suitable manner, such as with the threaded double nut 44 described above in relation to FIG. 2.

Then, molten injection molding material is introduced into the manifold 112 via the sprue (not shown), to the branching passage 119 of the sprue pad 125. The molten material flows through the central flow passage 114 and out through the branching passages 119 of the nozzle pads 127. The molten material then flows through the nozzles 16 and into the mold cavity (not shown). It should be appreciated that any number of insulators (not shown), such as the first, second, and third insulators 18, 22, 24 of FIGS. 1 through 3, could be included in the machined manifold assembly.

Also, a plurality of heaters, such as the heaters 28 described above in relation to FIG. 1, can be disposed about the outer surface 115 of the manifold 112 during the injection molding process. As will be described in greater detail below, the generally circular cross section of the manifold 112 of FIG. 5 allows for more even heating of the manifold 112 and thus the molten material flowing therethrough. As such, use of the manifold 112 improves the quality of the molded part.

Referring now to FIGS. 6 through 9, a method, according to the present invention, of making the manifold 112 of FIG. 5 is illustrated. In the first step, illustrated in FIG. 6, the method includes providing a bar 130 and positioning the bar 130 within a conventional milling machine, generally indicated at 131, for machining with any one of a plurality of conventional cutters 132. In one embodiment, a bore is formed longitudinally through the bar 130 before being positioned in the milling machine 131 to thereby form the central flow passage 114 and to thereby provide a means of securing the bar 130 within a chuck 134 of the milling machine 131. The bar 130 is made out of metal and is selected from either a round bar stock or rectangular bar stock. It should be appreciated that FIGS. 6 through 9 illustrate subsequent steps of machining the bar 130 to form the generally round outer surface 115, the pads 121, the central flow passage 114, and the branching passages 119 of the manifold 112.

Figure 7:
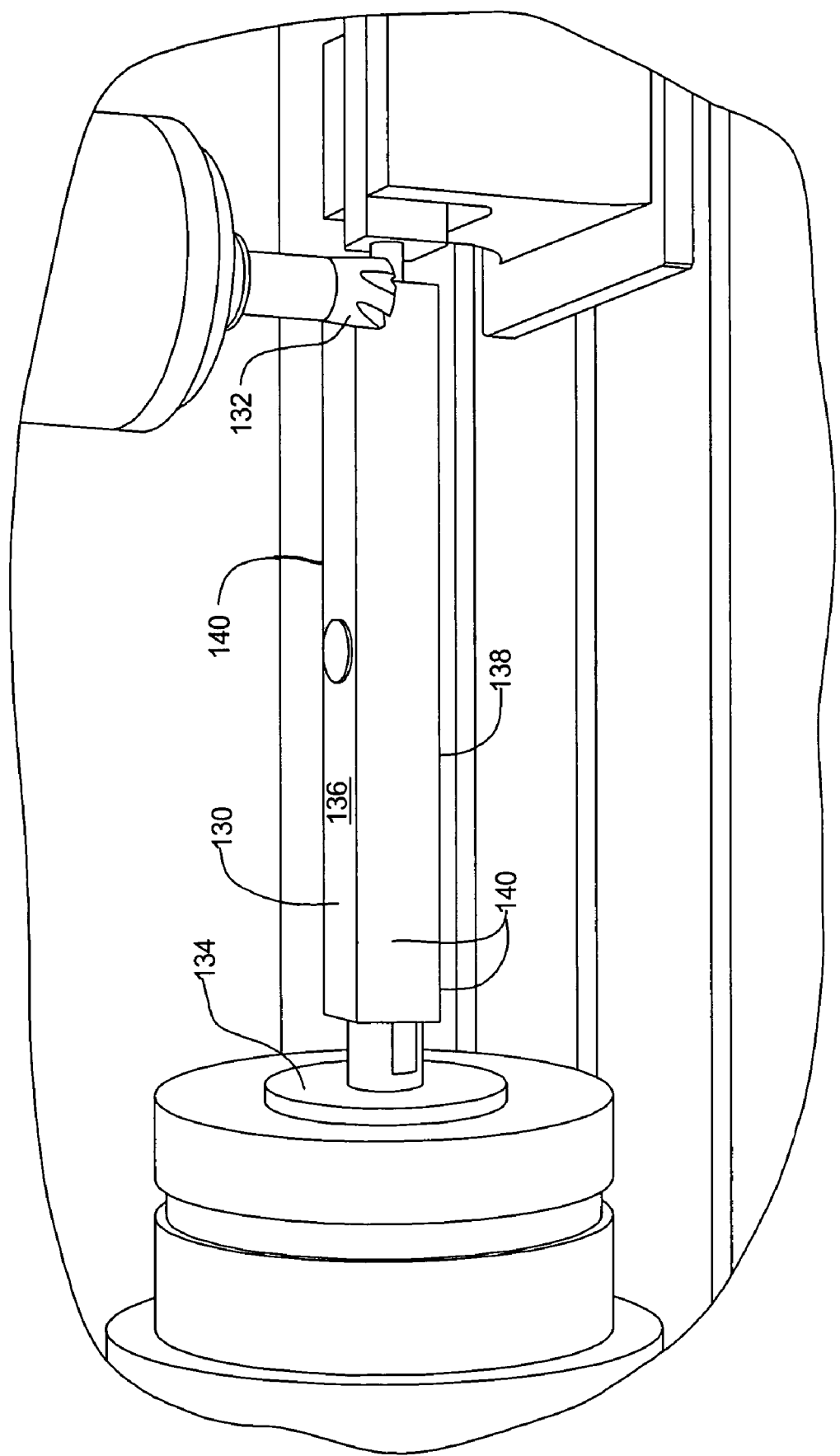
FIG. 7 is a view similar to FIG. 6 illustrating a second step of the method of making a machined manifold assembly.

As illustrated in FIG. 7, the next step of the method includes machining the bar 130 until the bar 130 has a generally rectangular cross-sectional shape. The cutter 132 can be actuated in any suitable way, and the chuck 134 can rotate the bar 130 in any suitable manner in order to create the rectangular bar 130. In this rectangular shape, the bar 130 defines a first side 136, a second side 138 opposite to the first side 136, and a plurality of edges 140 extending longitudinally along the bar 130. It should be appreciated that, as cutting progresses, eventually the cut depth will reach that of the terminal end 123 of the pads 121. For example, the terminal end 123 of the sprue pad 125 is visible in FIG. 6. As the bar 130 is cut to further depths, the cutter 132 is moved so as to avoid the pads 121, thereby forming the pads 121.

Figure 8:
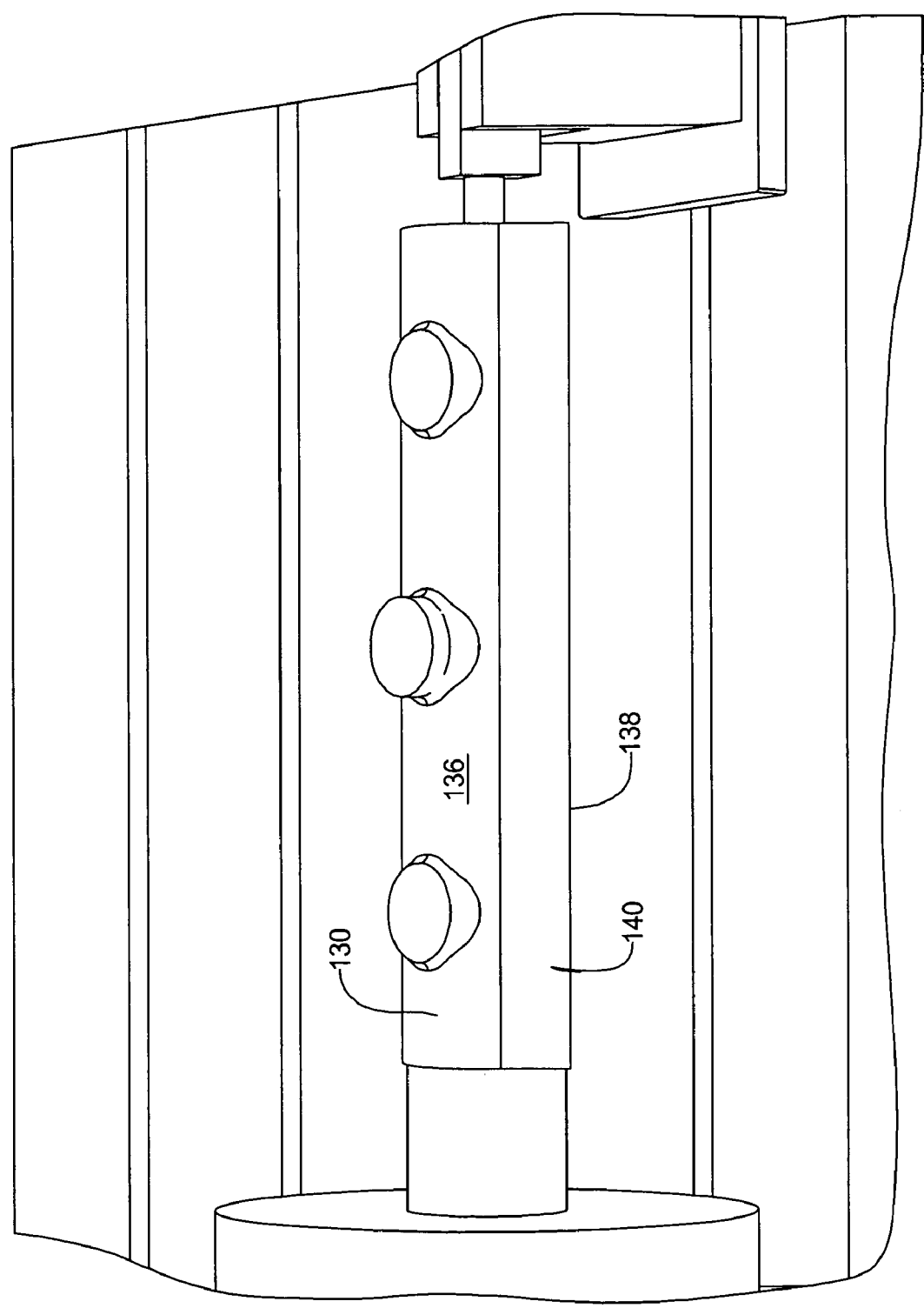
FIG. 8 is a view similar to FIG. 6 illustrating a third step of the method of making a machined manifold assembly.

Next, as illustrated in FIG. 8, the method includes the step of rounding the bar 130 so as to form the outer surface 116 of the manifold 112 with the plurality of pads 122. In the embodiment illustrated, this step involves rounding the first side 136 of the bar 130. The cutter 132 passes over the bar 130 to thereby remove the edges 140 on the first side 136 of the bar 130 and create half of the rounded outer surface 115 of the manifold 112. As illustrated in FIG. 8, the cutter 132 avoids the pads 121 while rounding the first side 136 of the bar 130 to thereby form the pads 121 on the first side 136.

Then, the method includes the step of rotating the bar 130 about the longitudinal axis, L. In the embodiment illustrated in FIG. 9, the chuck 134 of the milling machine 131 rotates the bar 130 one hundred eighty degrees (180°) about the axis, L.

Figure 9:
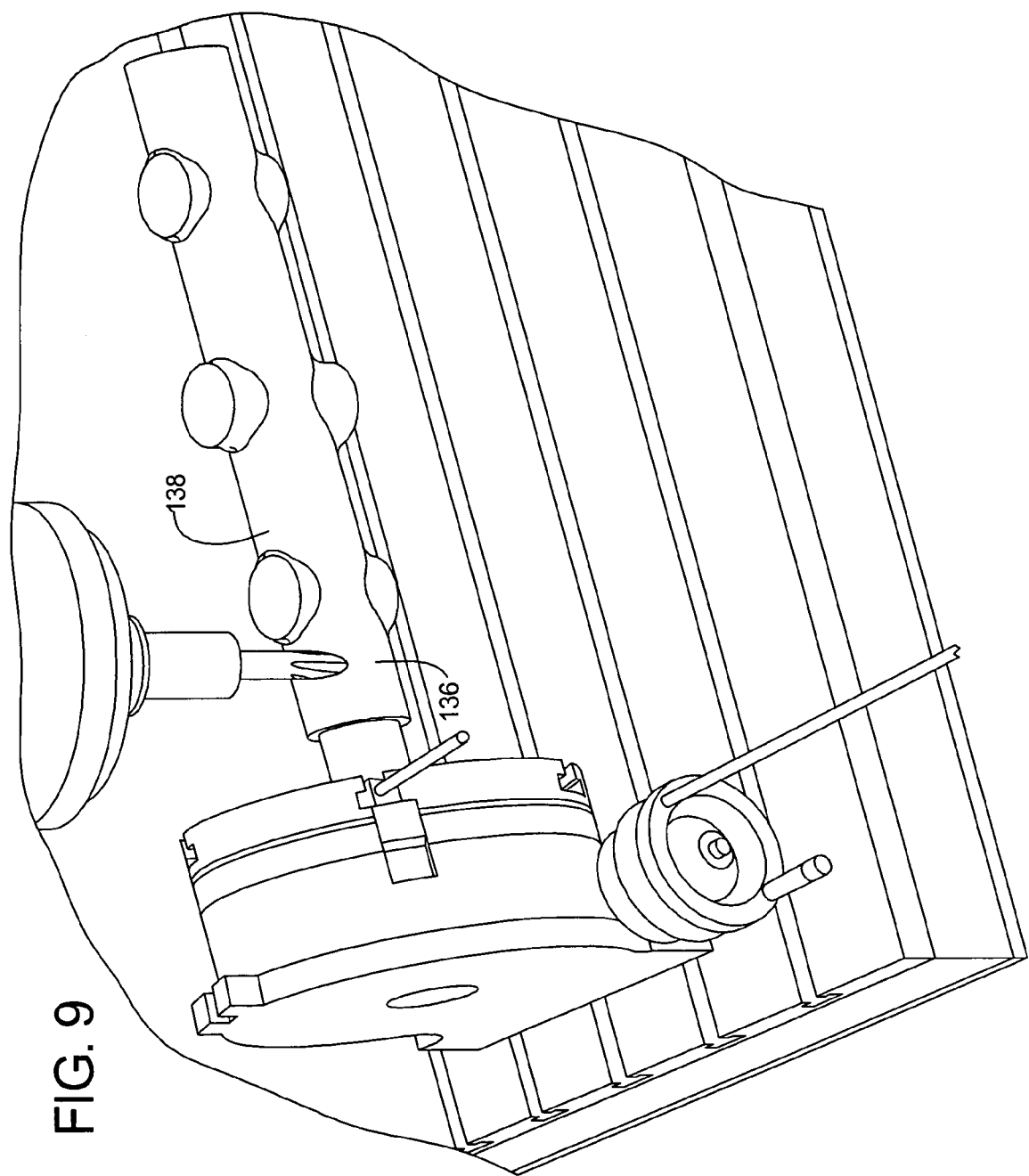
FIG. 9 is a view similar to FIG. 6 illustrating a fourth step of the method of making a machined manifold assembly.

Subsequently, the method includes the step of rounding the second side of the bar 130 as illustrated in FIG. 9. As before, the cutter 132 passes over the bar 130 to thereby remove the edges 140 on the second side 138 of the bar 130 and create the other half of the rounded outer surface 115 of the manifold 112. As illustrated in FIG. 9, the cutter 132 avoids the pads 121 while rounding the second side 138 of the bar 130 to thereby form the pads 121 on the second side 138.

Finally, the method includes the step of forming the plurality of branching passages 119 through corresponding ones of the pads 121. The branching passages 119 can be formed in any suitable manner and are drilled so as to be in fluid communication with the central flow passage 114.

Thus, the manifold 112 of the present invention can be machined, and this method of manufacture can save costs in comparison with casting operations in some situations. Also, the completed manifold 112 includes a machined outer surface 115 that is generally round in cross section. As such, band heaters 28 such as those illustrated in FIG. 1, or other heaters (not shown) can be used on the outer surface 115 of the manifold 112 to heat the molten injection molding material. The round outer surface 115 and the round central flow passage 114 make the manifold 112 highly symmetrical in cross section, thereby allowing heat to evenly distribute through the manifold 112. As such, the quality of the molded parts improves.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A machined manifold for conveying injection molding material into a mold from a molding material supply, said machined manifold comprising:
    a main flow member having a central flow passage extending therethrough along a longitudinal axis of said main flow member;
    a plurality of pads extending outwardly from said main flow member, said pads and said main flow member being integral, unitary, and one-piece with each other;
    a plurality of branching passages extending through corresponding ones of said pads each transverse to and in fluid communication with said central flow passage; and
    wherein said main flow member and said pads have an outer surface that is machined so as to be generally round in cross sectional shape.

2. A machined manifold as set forth in claim 1 wherein said pads extend outwardly from said outer surface.

3. A machined manifold as set forth in claim 2 wherein said pads comprise a sprue pad and a plurality of nozzle pads, wherein said sprue pad extends outward from said outer surface farther than said nozzle pads.

4. A machined manifold as set forth in claim 1 wherein said main flow member comprises a bar that is machined until said bar has a generally rectangular cross sectional shape and then is rounded so as to define said outer surface.

5. A machined manifold as set forth in claim 4 wherein said bar is rounded on a first side, then rotated about said longitudinal axis, and then rounded on a second side.

6. A machined manifold as set forth in claim 4 wherein said bar is selected from a group comprising a round bar stock and a rectangular bar stock.

7. A machined manifold as set forth in claim 1 wherein said central flow passage is generally round in cross sectional shape.

8. A machined manifold as set forth in claim 1 wherein said central flow passage is centered within said main flow member.

9. A machined manifold assembly for conveying injection molding material into a mold from a molding material supply, said machined manifold assembly comprising:
    a manifold including a manifold flow passage extending therealong;
    a plurality of nozzle pads extending radially outwardly from said manifold to a distal end, said nozzle pads including a central nozzle passage extending from and in fluid communication with said manifold flow passage; and
    said manifold and said nozzle pads being machined from a metal material so as to be generally round in cross sectional shape and being integral, unitary, and one-piece with each other.

* * * * *